United States Patent [19]

Babuder et al.

[11] Patent Number: 5,207,135
[45] Date of Patent: May 4, 1993

[54] MULTISPINDLE LATHE AND METHOD FOR MACHINING WORKPIECES

[75] Inventors: Kirt M. Babuder, Euclid; Theodore Cioban, Parma; Alan F. Primosch, Euclid, all of Ohio

[73] Assignee: The National Acme Company, Cleveland, Ohio

[21] Appl. No.: 938,950

[22] Filed: Sep. 1, 1992

[51] Int. Cl.$^5$ ............................ B23B 9/04; B23B 1/00
[52] U.S. Cl. ........................................ 82/129; 82/1.11; 82/124; 82/127
[58] Field of Search ................. 82/1.11, 124, 125, 126, 82/127, 129

[56] References Cited

U.S. PATENT DOCUMENTS

| | | | |
|---|---|---|---|
| 4,457,193 | 7/1984 | Matthey | 82/129 |
| 4,557,166 | 12/1985 | Jauch | 82/124 |
| 4,987,807 | 1/1991 | Simon | 82/124 |

FOREIGN PATENT DOCUMENTS

| | | | |
|---|---|---|---|
| 131401 | 6/1991 | Japan | 82/129 |

Primary Examiner—William E. Terrell
Attorney, Agent, or Firm—Pearne, Gordon, McCoy & Granger

[57] ABSTRACT

A multispindle lathe is disclosed which has an indexable drum including a plurality of main spindles. A secondary spindle opposes the main spindles so that it is coaxial with one of the main spindles at an indexed position. The secondary spindle is rotatable on a fixed axis and can be moved axially towards the main spindle. The rotation of the secondary spindle can be synchronized with the rotation of the main spindle so that both spindles can hold a workpiece. A cut off tool moves transversely to the spindles to cut the workpiece from bar stock which has been fed into the main spindle. After cut off, the secondary spindle moves away from the main spindle and a secondary tool moves transversely to the secondary spindle to machine the end of the workpiece which has just been cut off. Movement of the secondary tool and secondary spindle can be coordinated to form curves and tapered threads.

11 Claims, 8 Drawing Sheets

Fig.6A  INDEX COMPLETE

Fig.6B  COUNTERSPINDLE FORWARD CLOSE COLLECT

Fig.6C  CUTOFF

Fig.6D  COUNTERSPINDLE BACK

MULTISPINDLE LATHE AND METHOD FOR MACHINING WORKPIECES

BACKGROUND OF THE INVENTION

FIELD OF THE INVENTION

This invention relates to automatic machine tools such as multispindle lathes and especially to such multispindle machines generally referred to as bar machines. More particularly, the invention relates to a multispindle lathe having a secondary spindle located at one of the stations (preferably the last sequential station) in opposed relation to the respective primary spindle, in axial alignment therewith and adapted to be synchronized therewith to receive a cut off workpiece therefrom.

DESCRIPTION OF THE RELATED ART

A multispindle lathe includes a plurality of parallel driven spindles, each spindle being equipped with a chuck or a collet mechanism whereby the spindle can carry a workpiece. In the case of bar machines, the workpiece is supplied to the spindles as bar stock. The spindles are arranged on a rotatable drum carried by the frame of the lathe, the spindles being spaced around and parallel to the axis of rotation of the drum. Adjacent the drum, the frame of the lathe carries a plurality of moveable tool holders carrying tools for performing machining operations on the workpieces carried by the spindles, the drum being indexable to bring each workpiece in turn adjacent each tool.

After completion of machining of the region of the workpiece projecting from each chuck, and after the workpiece is cut off from the bar stock, it is usually necessary to machine the end which was held near the chuck and which was cut off from the bar stock. It is known to perform such machining by mounting the workpiece in a separate machine, but this is disadvantageous both in the requirement for an additional machine and in that the workpieces must be transferred to and mounted in the additional machine, which requires additional effort and time.

U.S. Pat. No. 4,987,807 to Simon shows a multispindle lathe having a secondary spindle opposing (at one station) the spindles on the drum. The secondary spindle is mounted on a two axis slide system so that the spindle can be axially aligned with the primary spindle at one of the work stations. The secondary spindle can grab a workpiece from one of the primary spindles and then move the workpiece to an area adjacent the drum where one or more tools are located for machining the end of the workpiece which was formerly held near the primary spindle. Although the system described in Simon eliminates the need to transfer a workpiece to another machine, it still requires a significant time during which the workpiece is translated from the primary spindle to the tools which work the piece while it is held in the secondary spindle. Further, the two axis slide system on which the secondary spindle is mounted fills considerable space in the machine and can hinder access to components in the workspace. Also, where the secondary spindle grasps a workpiece from a primary spindle, it is necessary to precisely realign the secondary spindle with the primary spindle after each operation.

It is an object of the present invention to provide a multispindle lathe having the facility for performing a variety of machining operations on the end of a workpiece which has been cut off of bar stock after the workpiece has been machined while held in a main spindle. It is desired that the machine perform its function as quickly and simply as possible with a minimum amount of equipment in the workspace while maintaining great precision in the machining of the workpiece.

SUMMARY OF THE INVENTION

The multispindle lathe of the invention includes a frame having a bed and spaced apart first and second housings fixed to the bed. The first and second housings define a workspace therebetween and an indexable drum is mounted for rotation on the first housing. Also included is a means for indexing the drum relative to the first housing about an axis of rotation of the drum. A plurality of driven main spindles are carried by the drum. Each of the spindles has an axis of rotation disposed parallel to and spaced about the drum axis. Each of the main spindles is positioned to carry a workpiece within the workspace. A plurality of tool mechanisms are carried by the frame and are disposed about the drum axis for machining workpieces carried by the main spindles. A secondary spindle faces toward the main spindles and has a fixed axis of rotation coaxial with one of the main spindles when the main spindle is indexed in a position opposite the secondary spindle. The secondary spindle is equipped to grip a portion of a workpiece carried by one of said main spindles. Also included is a drive means for rotating the secondary spindle. A single axis fixed slide in the workspace supports a tool support so that a tool in the tool support can be moved transversely with respect to the axis of the secondary spindle to engage a workpiece carried by a secondary spindle.

In operation, a workpiece on the end of a piece of bar stock is fed into and held by one of the main spindles. The main spindle is rotated to rotate the workpiece. While rotating, the workpiece is machined by tools at a plurality of stations as the drum is indexed to each of the stations. The drum is indexed to a position opposite the secondary spindle and the secondary spindle is moved axially toward the workpiece. Rotation of the secondary spindle is synchronized with the rotation of the main spindle holding the workpiece. The workpiece is gripped by the secondary spindle and a cutting tool is moved transversely toward the workpiece. The cutting tool engages the workpiece to cut it from the bar stock. The workpiece is then moved axially away from the main spindle and the cutting tool is moved transversely away from the workpiece. A secondary tool on a slide is then moved transversely toward the axis of the secondary spindle. The secondary spindle is moved axially toward the secondary tool so that the secondary tool engages the workpiece. If necessary, the secondary tool can include a plurality of elements for performing different machining operations on the end of the workpiece. The secondary spindle is then moved axially away from the secondary tool and the workpiece is released from the secondary spindle. The secondary tool is moved transversely away from the secondary spindle axis.

According to the invention, the end of the workpiece which has been cut from the bar stock can be machined by the secondary tool with a minimum amount of movement of the workpiece. Moreover, the movement of the secondary tool and secondary spindle can be coordinated for simultaneous movement for such operations as cutting a bevel or a tapered thread. The present invention is also applicable to machining a workpiece which is not at the end of a bar stock when it is held in the main spindle. Thus, the present invention machines the end of a workpiece quickly and precisely with a minimum of apparatus in the workspace. By not moving the secondary spindle transversely, realignment with the main spindle is not required after machining a workpiece. Thus, time is saved and precision maintained.

DETAILED DESCRIPTION OF THE PREFERRED EMBODIMENTS

Figure 1:
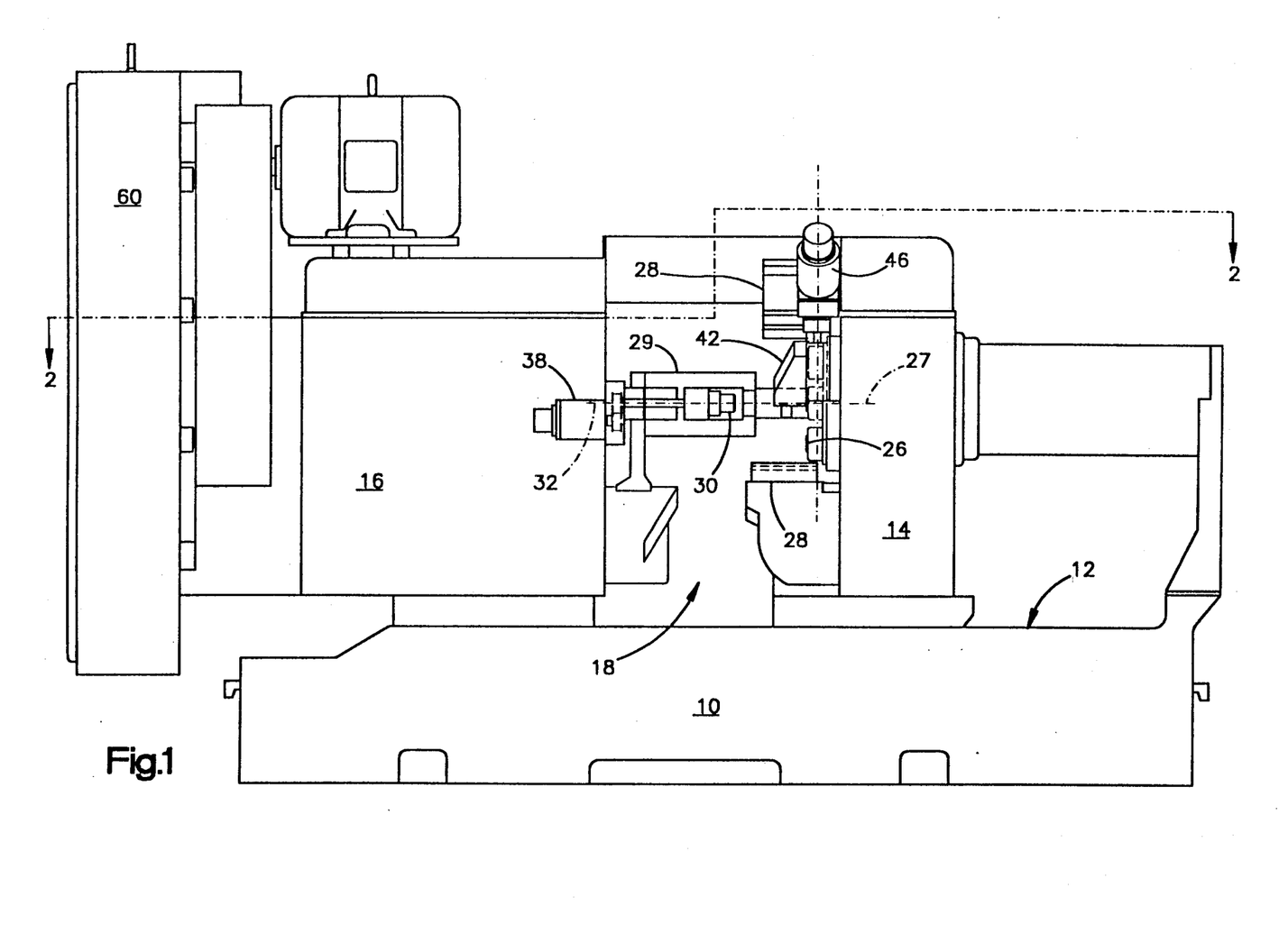
FIG. 1 is a side view elevation of a multispindle lathe in accordance with the present invention.
Figure 2:
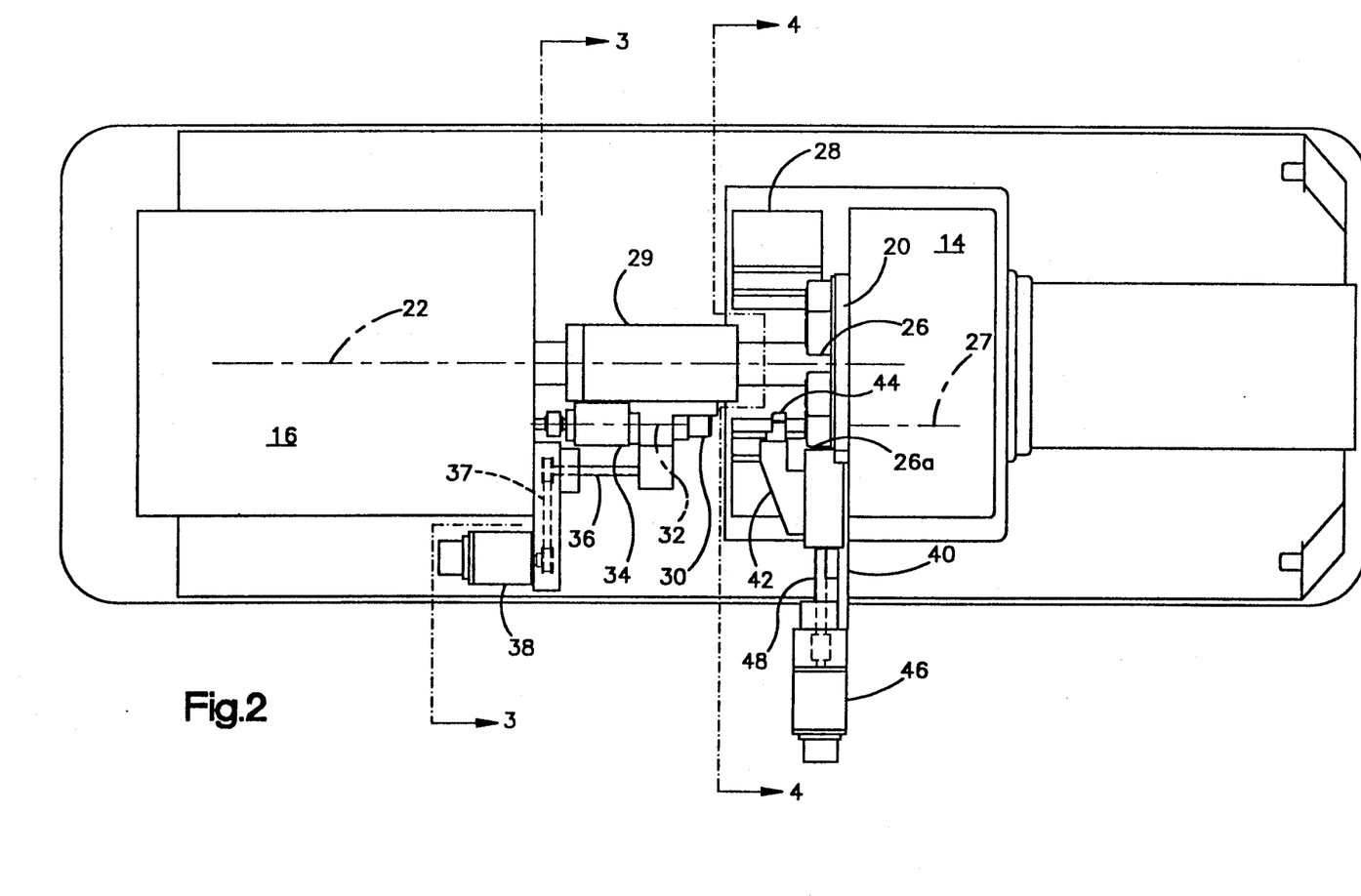
FIG. 2 is a top view of the lathe along line 2—2 of FIG. 1 showing the machine with the cover removed.
Figure 3:
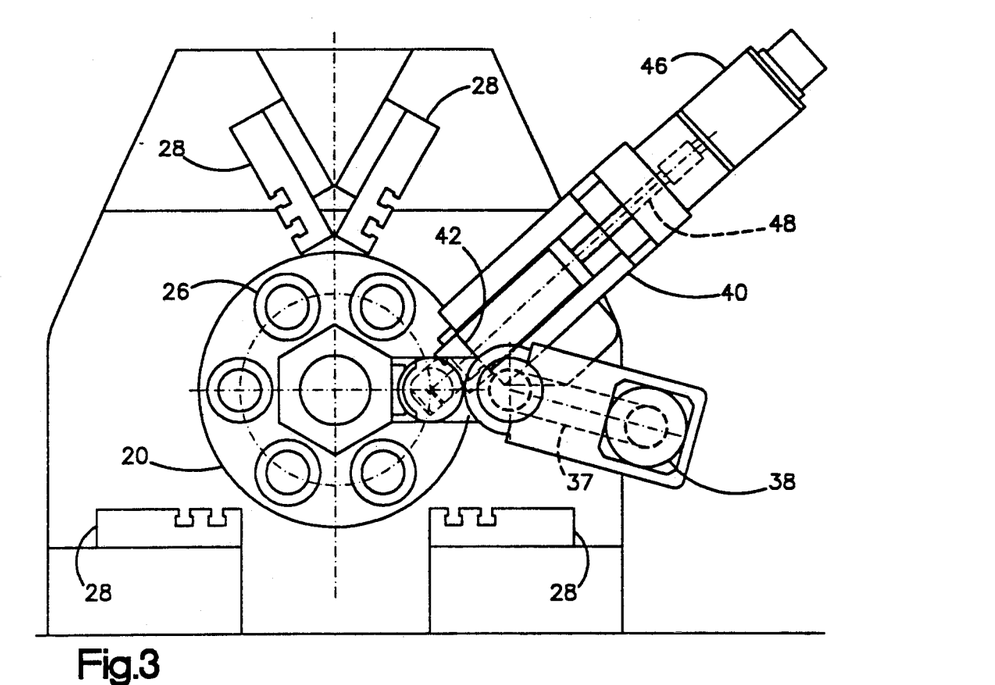
FIG. 3 is a sectional end view along line 3—3 of FIG. 2.
Figure 5:
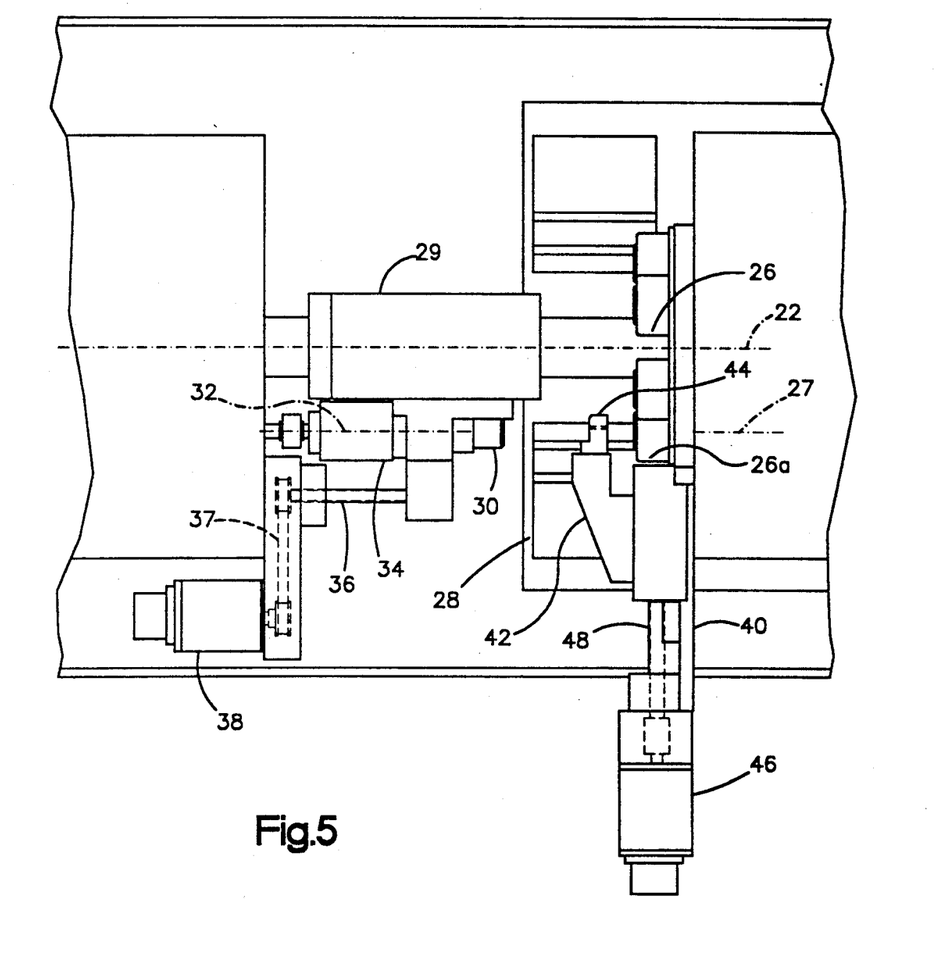
FIG. 5 is a top view of FIG. 2 in detail.

As shown in FIG. 1, an apparatus according to the invention includes a frame 10 having a bed 2. Mounted on the bed of the frame are a first housing 141 and a second housing 16 which define a workspace 18 therebetween. Rotatably mounted on the first housing 14 is a drum 20 having an axis of rotation 22 (see also FIG. 5). Enclosed in the first housing 14 is a means for indexing the drum 20 to selected positions on its rotational axis. Such an indexing means is known in the art. The drum 20 carries a plurality of rotatable main spindles 26 each having an axis of rotation parallel to the drum axis 22. The embodiment shown includes six main spindles 26. The main spindles 26 each include a chuck or collet used to securely hold a workpiece for rotational movement of the workpiece in the spindle. The main spindles 26 move with the drum to specified locations for performing operations on the workpiece. One such position is shown wherein one main spindle 26a is indexed to a location such that the main spindle 26a has an axis of rotation 27.

A plurality of tool mechanisms 28 are located on the frame 10 adjacent the main spindles 26. The tool mechanisms 28 slidably carry tools which engage a workpiece during rotation to perform a variety of machining operations on a workpiece. A boring tool mechanism 29 is slidably mounted on the drum axis 22 to hold a plurality of boring tools for working an exposed end of a workpiece held in a main spindle 26. Tool mechanisms 28 and 29 are known in the art and the details of the tools and supports for the tools have been omitted for clarity.

Everything heretofore described is known in the art and such machines are commonly used. Described below are improvements to the known machine described above.

Mounted on the second housing 16 is a secondary spindle 30 known as a counterspindle. The secondary spindle 30 is rotatable about a fixed secondary spindle axis 32 which is parallel to the drum axis 22. The secondary spindle 30 is similar to the main spindles 26 in that it comprises a chuck or collet capable of holding a workpiece for rotational motion. The secondary spindle 30 opposes the main spindle 26a so that the main spindle axis 27 is coaxial with the secondary spindle axis 32. The secondary spindle 30 is moveable along its axis of rotation 32 which is known as Z axis movement. However, the secondary spindle 30 is transversely fixed in position so that its secondary spindle axis 32 is not transversely moveable.

The secondary spindle 30 includes a secondary spindle drive 34 for rotational movement of the spindle. The secondary spindle 30 is mounted on a secondary spindle slide 36 to permit the aforementioned movement along the Z axis. A slide drive 37 and motor 38 such as a servo motor is used for moving the secondary spindle 30 to a precise location along the Z axis.

A secondary tool slide 40 holds a secondary tool support 42 which in turn holds a secondary tool 44 having tool elements 45a and 45b in the workspace 18. The secondary tool slide 40 is shown in the preferred embodiment as being mounted on the first housing 14, however, it can be mounted in any manner such that the tool 44 is in the workspace 18 such that it can engage a workpiece held in the secondary spindle 30. A secondary tool slide drive motor 46 such as a servo motor is used to turn a secondary tool slide drive 48, which is typically a screw drive, such that the tool can be moved transversely to the secondary spindle axis 32. This is known as motion along the X axis.

Figure 4:
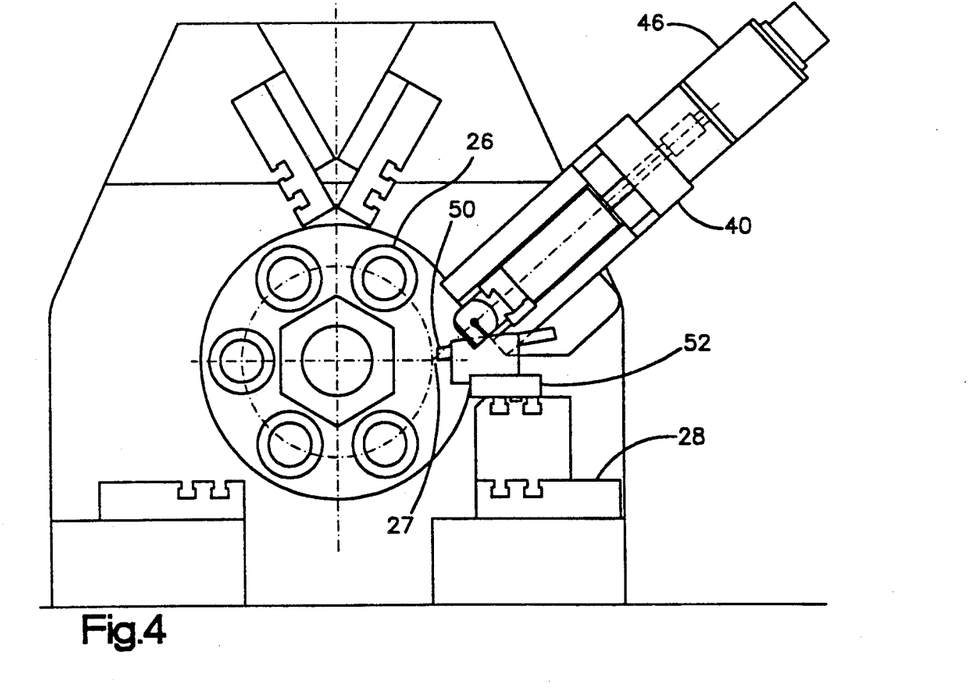
FIG. 4 is a sectional end view along line 4—4 of FIG. 2 in detail.

As shown in FIG. 4, one of the tool mechanisms 28 near the main spindle 26a carries a cut off tool 50 in a cut off tool support 52. The tool mechanism permits transverse movement of the tool relative to the spindle axis 27. This is known as B axis movement. The cut off tool 50 is located so that it can engage a workpiece in a main spindle 26a having an axis of rotation 27.

Operation is controlled by a controller 60 which is typically mounted on the second housing 16. A 9/240 CNC system manufactured by Allen Bradley or another known controller can be used. The controller 60 as is known in the art, indexes the main spindles 26 and the drum 20 to selected positions. The controller 60 also moves tools on the tool mechanisms 28 and 29 to engage workpieces held in the main spindles 26 while the spindles rotate.

Figure 8:
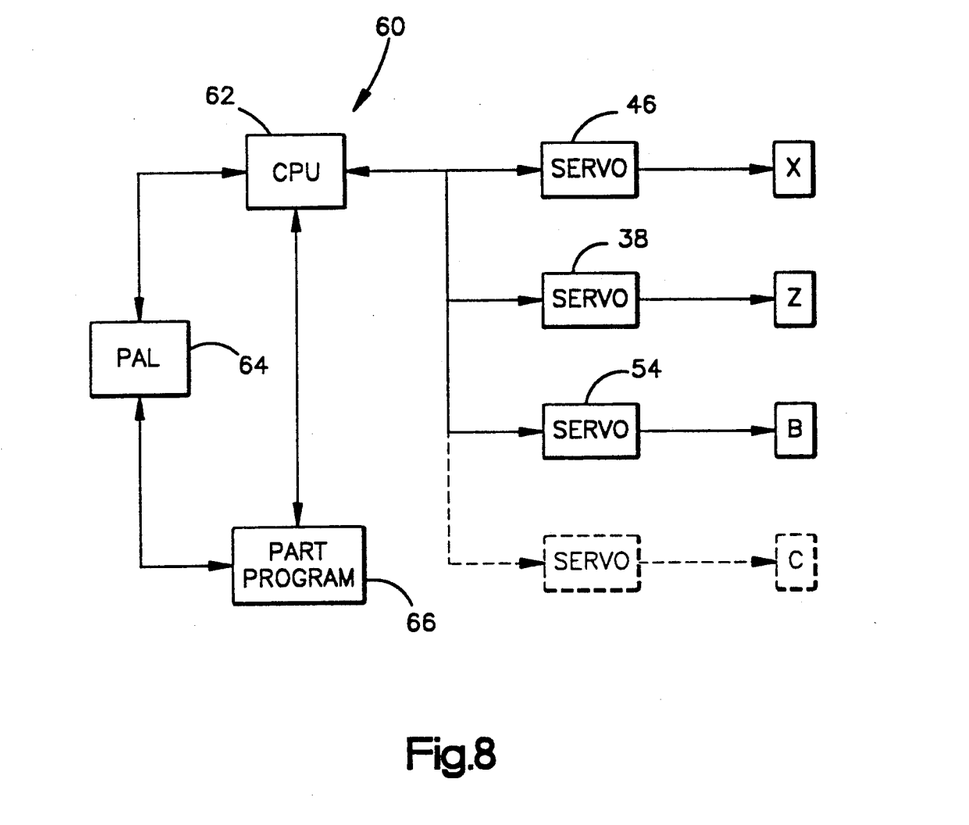
FIG. 8 is a block diagram showing components of a control system for the present invention.

As shown in FIG. 8, the controller 60 includes a central processing unit (CPU) 62, programmable application logic (PAL) 64 and a part program 66. Each of these components interfaces with the other. The PAL 64 controls all aspects of machine operation except movement of the tools and axial movement of the secondary spindle 30. The part program 66 is unique for each type of part to be machined from the workpiece. The CPU 62 is connected to control the secondary tool slide drive motor 46, the secondary spindle slide drive motor 38 and a cut off tool slide drive motor 54 which moves the cut off tool 50. The part program 66 interfaces with the motors 46, 38 and 54, shown here as servo motors to control movement along the X, Z and B axes. The part program 66 coordinates movement of the servos to perform the operations necessary to machine the workpiece to the desired finished product as described below.

A typical CPU such as used in the Allen Bradley 9/240 CNC controller is designed to control up to four servos for movement along four axes. In the present application, the capability to control a fourth operation is not used and is shown in phantom as controlling a servo for motion along the C axis. Typically, several CPU's are included in a controller for controlling movement of other components, not described in detail in this specification.

In the present invention, as in conventional machines, a piece of bar stock is fed into a main spindle 26 at one of the indexed positions. While rotating in the spindle, the workpiece is moved through each of the indexed positions. At each position, tools engage the workpiece to machine the workpiece.

Figure 6A:
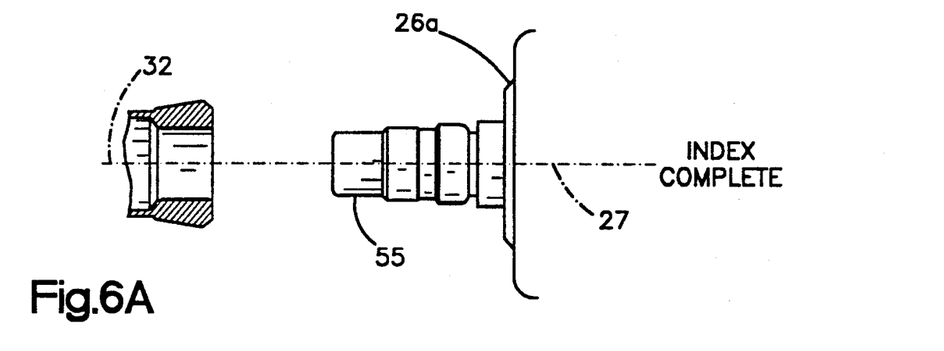
FIGS. 6a–6g show steps of a typical machining operation in accordance with the invention.
Figure 6B:
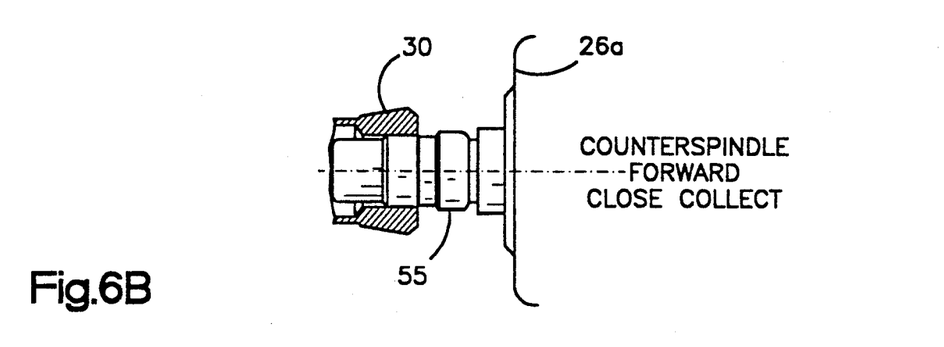
Figure 6C:
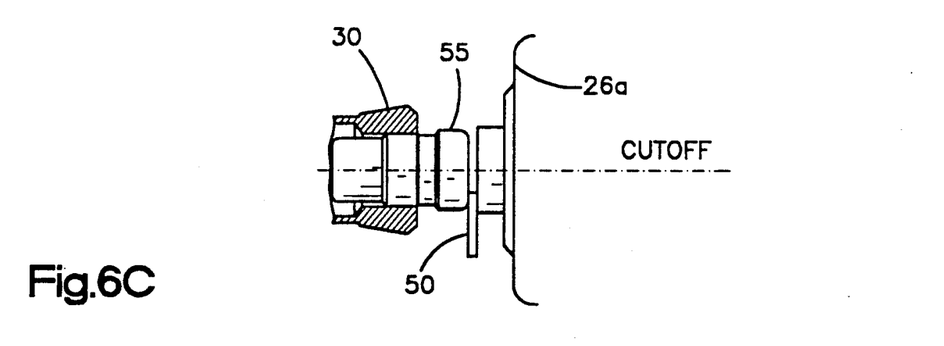
Figure 6D:
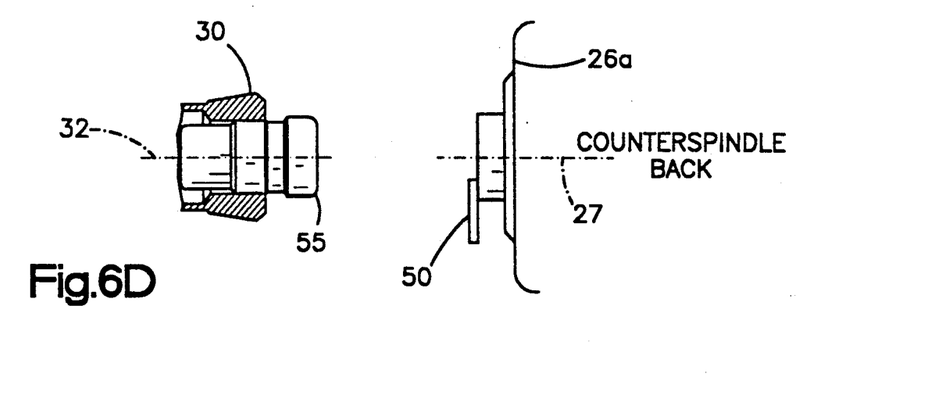
Figure 6E:
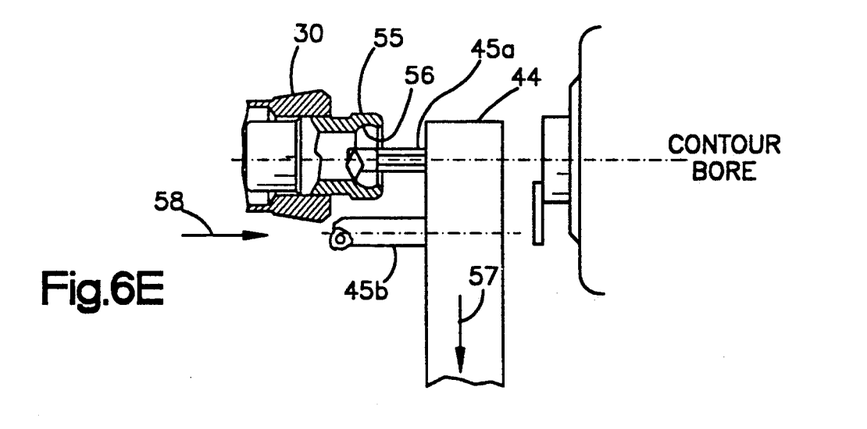
Figure 6F:
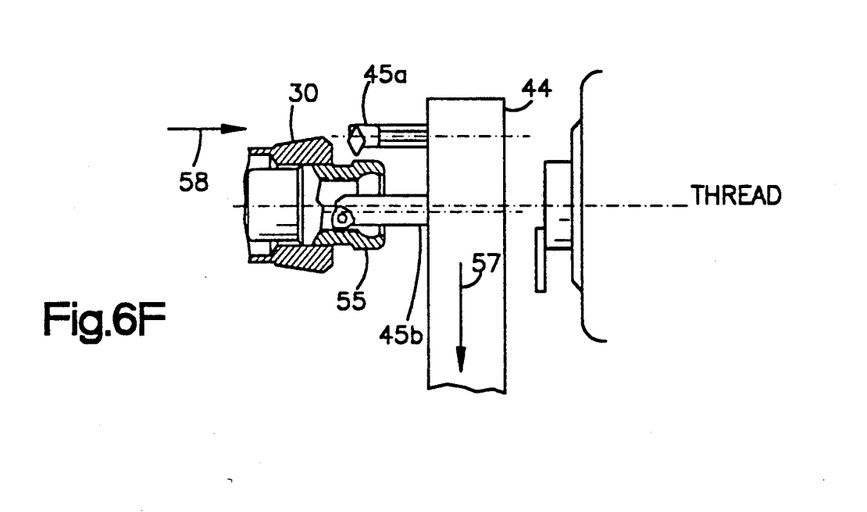
Figure 6G:
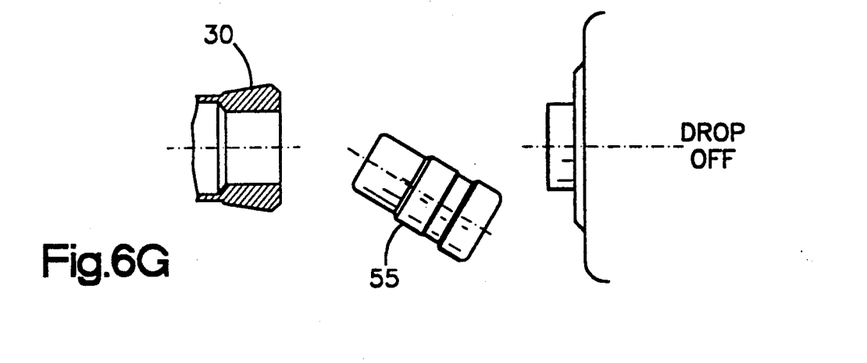
Figure 7:
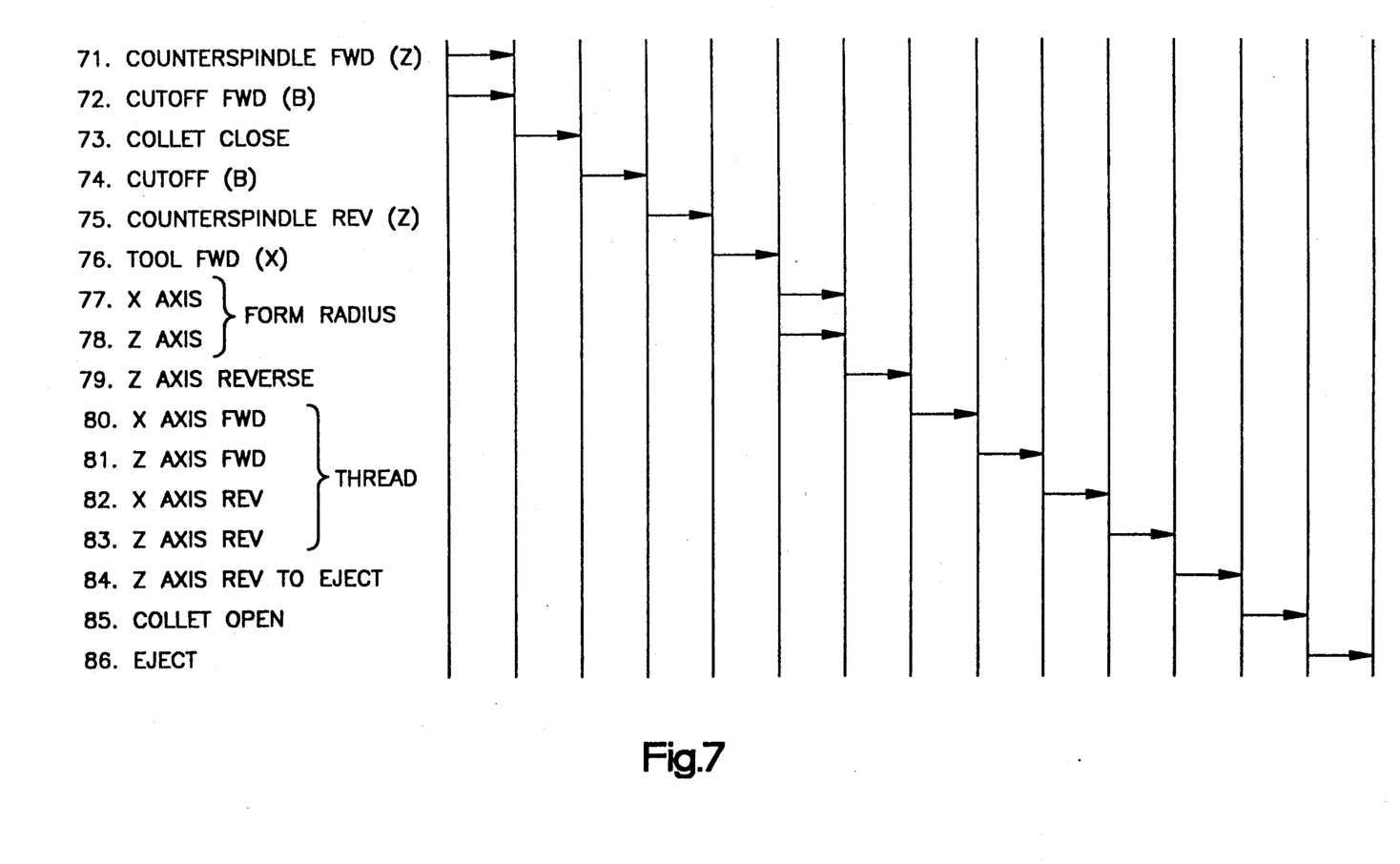
FIG. 7 is a timing diagram showing the steps of a typical machining operation in accordance with the invention.

FIGS. 6 and 7 show the operation of the present invention once a workpiece 55 has been indexed to the position with the axis 27. The operation of the present invention departs from conventional machines in that, when the workpiece reaches the last index position, having axis 27, the secondary spindle 30 is moved along its axis 32 toward the workpiece 55 and spindle 26a (FIG. 6a, Step 71). The controller 60 controls the secondary spindle drive 34 to synchronize the rotation of the secondary spindle 30 with the main spindle 26a. The cut off tool 50 is simultaneously moved toward the main spindle axis 27 (Step 72). When the speeds are synchronized, the secondary spindle 30 grasps the workpiece so that the secondary spindle 30 and the main spindle 26a are both holding the workpiece 55 and rotating simultaneously (FIG. 6b, Step 73). The cut off tool then engages the workpiece 55 and cut it from the bar stock of which it was previously a part (FIG. 6c, Step 74). Simultaneous movement of the secondary spindle and cut off tool reduces the total time of the machining operation but is not necessary. The secondary spindle 30 then moves along its axis 32 away from the main spindle 26a (Step 75). The secondary tool 44 is moved along its tool slide transversely toward the secondary spindle axis 32 to a position adjacent the end of the workpiece which has just been cut (FIG. 6d, Step 76). Simultaneous movement of the secondary spindle and secondary tool reduces machining time. The secondary spindle then moves axially toward the tool 44 so that the tool element 45a engages the workpiece 55 to perform a machining operation (Step 78). As shown in FIG. 6e, a counterbore can be formed in the end of the workpiece by cutting with the tool. When the counterbore has been completed, the secondary spindle 30 is moved axially away from the tool (FIG. 6f, Step 79). If no further operations are desired at this time, the workpiece is released from the secondary spindle and work on the workpiece is completed (Steps 85 and 86). However, as shown in FIG. 6, further operations can be performed. FIG. 6f shows that the tool 44 is moved along the X axis to bring another tool element 45b adjacent the end of the workpiece 55 (Step 80). The secondary spindle is then moved again axially toward the tool as shown in FIG. 6g to engage the tool element 45b to form a thread on the inside of the workpiece (Step 81). Typically, this will take several passes which will involve the spindle moving toward the tool and away from the tool several times to form the spiral thread while the tool moves in the direction of arrow 57 in FIG. 6g between each pass to make a deeper cut (Steps 82 and 83).

In some cases, it may be necessary to make a radius cut, a tapered thread or an angled cut, in such a case, it is possible for the controller to coordinate the axial motion of the secondary spindle 30 with the transverse motion of the tool 44 so that both are moving simultaneously. In the case of a radius cut, for example, the tool as shown in FIG. 6e would move opposite the direction of the arrow 57 while the secondary spindle would simultaneously move toward the tool in the direction of arrow 58 (Steps 77 and 78). In this way, the radius cut forms a curved surface 56 inside the workpiece.

When all operations on the workpiece have been completed, the secondary spindle moves away from the tool and the workpiece is released (Steps 85 and 86). The tool 44 is moved transversely away from the spindle 30 to permit the secondary spindle to again move axially toward the main spindle 26 in the position 27 to grasp another workpiece. Thus, the operations described above are repeated to machine a plurality of work pieces.

The present disclosure describes several embodiments of the invention, however, the invention is not limited to these embodiments. Other variations are contemplated to be within the spirit and scope of the invention and appended claims.

What we claim is:

1. In a multispindle lathe including a frame having a bed and spaced apart first and second housings fixed to the bed, said first and second housings defining a workspace therebetween, an indexable drum mounted for rotation on said first housing; means for indexing said drum relative to said first housing about the axis of rotation of said drum; a plurality of driven main spindles carried by said drum, said main spindles having axes of rotation disposed parallel to and spaced about said drum axis; each said main spindle being positioned to carry a workpiece within said workspace; and a plurality of tool mechanisms carried by said frame and disposed about said drum axis for machining workpieces carried by said main spindles, the improvement which comprises:

a secondary spindle facing toward said main spindles and having a fixed axis of rotation coaxial with one of said main spindles when said main spindle is indexed in a position opposite said secondary spindle, said secondary spindle being equipped to grip a portion of a workpiece carried by one of said main spindles;

drive means for rotating said secondary spindle;

means for moving said secondary spindle linearly in an axial direction a single-axis tool slide located in said workspace a secondary tool support carried by said slide; and means for moving said secondary tool support on said slide transversely relative to said secondary spindle so that a secondary tool in said tool support can be moved transversely with respect to said axis of said secondary spindle to engage a workpiece carried by said secondary spindle.

2. A multispindle lathe according to claim 1, further comprising means to synchronize the rotation of said main and secondary spindles.

3. A multispindle lathe according to claim 1, further comprising means to coordinate the movement of said tool support and secondary spindle whereby said movements may be simultaneous.

4. A multispindle lathe according to claim 1, further comprising means to coordinate the movement of said tool support and secondary spindle.

5. A multispindle lathe according to claim 1, wherein the secondary spindle is mounted on said second housing.

6. A multispindle lathe according to claim 1, wherein the slide is mounted on said first housing.

7. A method of machining a workpiece on a multi-spindle lathe having a plurality of main spindles rotatably mounted on an drum capable of indexing the main spindles to a plurality of positions and a secondary spindle having a fixed axis of rotation coaxial with one of the spindle positions, comprising the steps of:

holding and rotating the workpiece in one of the main spindles;

machining the workpiece at a plurality of indexed positions;

indexing the spindle holding the workpiece to an indexed position opposite the secondary spindle;

moving the secondary spindle axially toward the workpiece;

synchronizing the rotational velocity of the secondary spindle with that of the main spindle;

grasping the workpiece with the secondary spindle;

releasing the main spindle from the workpiece;

moving the workpiece axially away from the main spindle;

moving a secondary tool on a slide transversely toward the axis of the secondary spindle;

moving the secondary spindle axially toward the secondary tool so that the secondary tool engages the workpiece;

moving the secondary spindle axially away from the secondary tool; and releasing the workpiece from the secondary spindle.

8. A method according to claim 7, wherein the transverse movement of the secondary tool and axial movement of the spindle are simultaneous when the secondary tool is engaging the workpiece.

9. A method according to claim 7, wherein the transverse movement of the secondary tool toward the workpiece is simultaneous with the axial movement of the secondary spindle away from the main spindle when the secondary tool is not engaging the workpiece.

10. A method according to claim 7, wherein the step of moving the workpiece axially away from the main spindle comprises the steps of:

moving a cut off tool transversely toward the workpiece;

cutting the workpiece from bar stock with the cut off tool; and moving the cut off tool transversely away from the workpiece.

11. A method according to claim 10, wherein the transverse movement of the cut off tool toward the workpiece is simultaneous with the axial movement of the secondary spindle toward the main spindle holding the workpiece.

* * * * *